United States Patent
Tanaka (10) Patent No.: US 8,941,894 B2
(45) Date of Patent: Jan. 27, 2015

(54) SCANNER DEVICE AND IMAGE FORMING APPARATUS HAVING THE SAME

(71) Applicant: KYOCERA Document Solutions Inc., Osaka-shi, Osaka (JP)

(72) Inventor: Koichi Tanaka, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/085,647

(22) Filed: Nov. 20, 2013

(65) Prior Publication Data

US 2014/0160538 A1 Jun. 12, 2014

(30) Foreign Application Priority Data

Dec. 12, 2012 (JP) ................................. 2012-271791

(51) Int. Cl.
*H04N 1/04* (2006.01)
*H05B 37/02* (2006.01)
*H04N 1/00* (2006.01)
*H04N 1/40* (2006.01)

(52) U.S. Cl.
CPC ........... *H05B 37/02* (2013.01); *H04N 1/00806* (2013.01); *H04N 1/00822* (2013.01); *H04N 1/00827* (2013.01); *H04N 1/40056* (2013.01)
USPC ........... 358/474; 358/505; 358/501; 382/124; 348/E5.037

(58) Field of Classification Search
CPC ... H04N 1/02815; H04N 1/10; G06K 9/0004; B26D 5/005; B26D 5/007; B26F 1/3806; C14B 5/00; H05B 37/02
USPC ......... 358/474, 461, 463, 504, 406, 465, 469, 358/475, 486, 496, 498, 505, 487; 382/274, 382/111, 124, 162, 218, 275, 282; 348/E3.019, E5.035, E5.037
See application file for complete search history.

(56) References Cited

U.S. PATENT DOCUMENTS

| | | | | |
|---|---|---|---|---|
| 4,814,618 A * | 3/1989 | Saito et al. | ..................... | 250/587 |
| 4,868,388 A * | 9/1989 | Horikawa | ..................... | 250/587 |
| 5,065,434 A * | 11/1991 | Matsuoka et al. | ............ | 382/114 |
| 5,313,311 A * | 5/1994 | Brandkamp | ..................... | 358/474 |
| 5,381,245 A * | 1/1995 | Johnston et al. | ............. | 358/487 |
| 5,461,459 A * | 10/1995 | Muramatsu et al. | ............ | 399/15 |
| 5,771,422 A * | 6/1998 | Morihara | ..................... | 399/50 |
| 5,802,217 A * | 9/1998 | Suzuki et al. | ................. | 382/274 |
| 6,316,767 B1 * | 11/2001 | Paxton et al. | ................. | 250/234 |
| 6,323,933 B1 * | 11/2001 | Anzai | ..................... | 355/23 |
| 6,323,965 B1 * | 11/2001 | Kodan | ..................... | 358/475 |
| 6,330,083 B1 * | 12/2001 | Nabeshima et al. | .......... | 358/474 |
| 6,806,483 B2 * | 10/2004 | Iihama et al. | ................. | 250/556 |
| 7,385,732 B2 * | 6/2008 | Sakai | ..................... | 358/463 |

(Continued)

FOREIGN PATENT DOCUMENTS

JP 2008113083 A 5/2008

*Primary Examiner* — Negussie Worku (74) *Attorney, Agent, or Firm* — Alleman Hall McCoy Russell & Tuttle LLP (57) ABSTRACT

A scanner device according to one aspect of this disclosure includes a document table, a light detecting portion, and a control portion. The light detecting portion detects light from an object placed on the document table. The control portion adjusts reading sensitivity for the object on the basis of a detection result of the light detecting portion.

18 Claims, 7 Drawing Sheets

(56) References Cited

U.S. PATENT DOCUMENTS

| | | | |
|---|---|---|---|
| 7,616,351 B2* | 11/2009 | Higashitani | 358/461 |
| 7,733,538 B2* | 6/2010 | Kanesaka et al. | 358/474 |
| 7,898,684 B2* | 3/2011 | Higashiura | 358/1.17 |
| 7,952,770 B2* | 5/2011 | Ikeno et al. | 358/461 |
| 8,130,423 B2* | 3/2012 | Nakano et al. | 358/474 |
| 8,228,568 B2* | 7/2012 | Yoshimoto et al. | 358/475 |
| 8,422,085 B2* | 4/2013 | Sakai et al. | 358/474 |
| 8,861,047 B2* | 10/2014 | Ishido | 358/488 |

* cited by examiner

SCANNER DEVICE AND IMAGE FORMING APPARATUS HAVING THE SAME

INCORPORATION BY REFERENCE

This application is based upon and claims the benefit of priority from the corresponding Japanese Patent Application No. 2012-271791 filed on Dec. 12, 2012, the entire contents of which are incorporated herein by reference.

BACKGROUND

The present disclosure relates to a scanner device and an image forming apparatus.

In association with recent development in informational technology, cellular phones, touch-panel-type tablet devices, and other terminal devices have become widely used by general users. These terminal devices have a display portion such as a liquid crystal screen for displaying images. A user can acquire desired information from images displayed on the display portion.

When one user intends to let other user view the information, the user typically sends the image data to a terminal device of the other user. However, the other user does not always carry a terminal device, or communication environment is not always established in the periphery. In such a case, it is conceivable to directly read the image displayed on the terminal device by a scanner device, and hand out a copy of the read image printed by a copying machine or the like. Such a situation is expected to further increase with the prevalence of terminal devices.

Conventionally, a facsimile apparatus having image reading means that reads a screen of an information terminal is disclosed. For enabling correct entry of a facsimile number without relying on the ten keys, the facsimile apparatus makes a scanner directly read a screen of an information terminal on which a facsimile number stored in advance is displayed, and recognizes a sequence of numerals from the image by character recognition means such as OCR (Optical Character Reader).

In this conventional art, simple information such as a facsimile number or a character displayed on a screen of a cellular phone is recognized. However, terminal devices that are recently marketed have a large screen, and information displayed on the screen such as color graphs and graphics has large amount of information. In addition, these terminal devices have backlight of liquid crystal, organic EL (Electro Luminescence), or the like, and the light of their display portion can be turned on/off. Accordingly, for appropriately reading the screen of such a terminal device by a scanner device, it is necessary to set the reading condition appropriately in each time.

SUMMARY

A scanner device according to one aspect of the present disclosure includes a document table, a light detecting portion, and a control portion. The light detecting portion detects light from an object placed on the document table. The control portion adjusts reading sensitivity for the object on the basis of a detection result of the light detecting portion.

An image forming apparatus according to another aspect of the present disclosure includes the aforementioned scanner device. The scanner device includes a document table, a light detecting portion, and a control portion. The light detecting portion detects light from an object placed on the document table. The control portion adjusts reading sensitivity for the object on the basis of a detection result of the light detecting portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
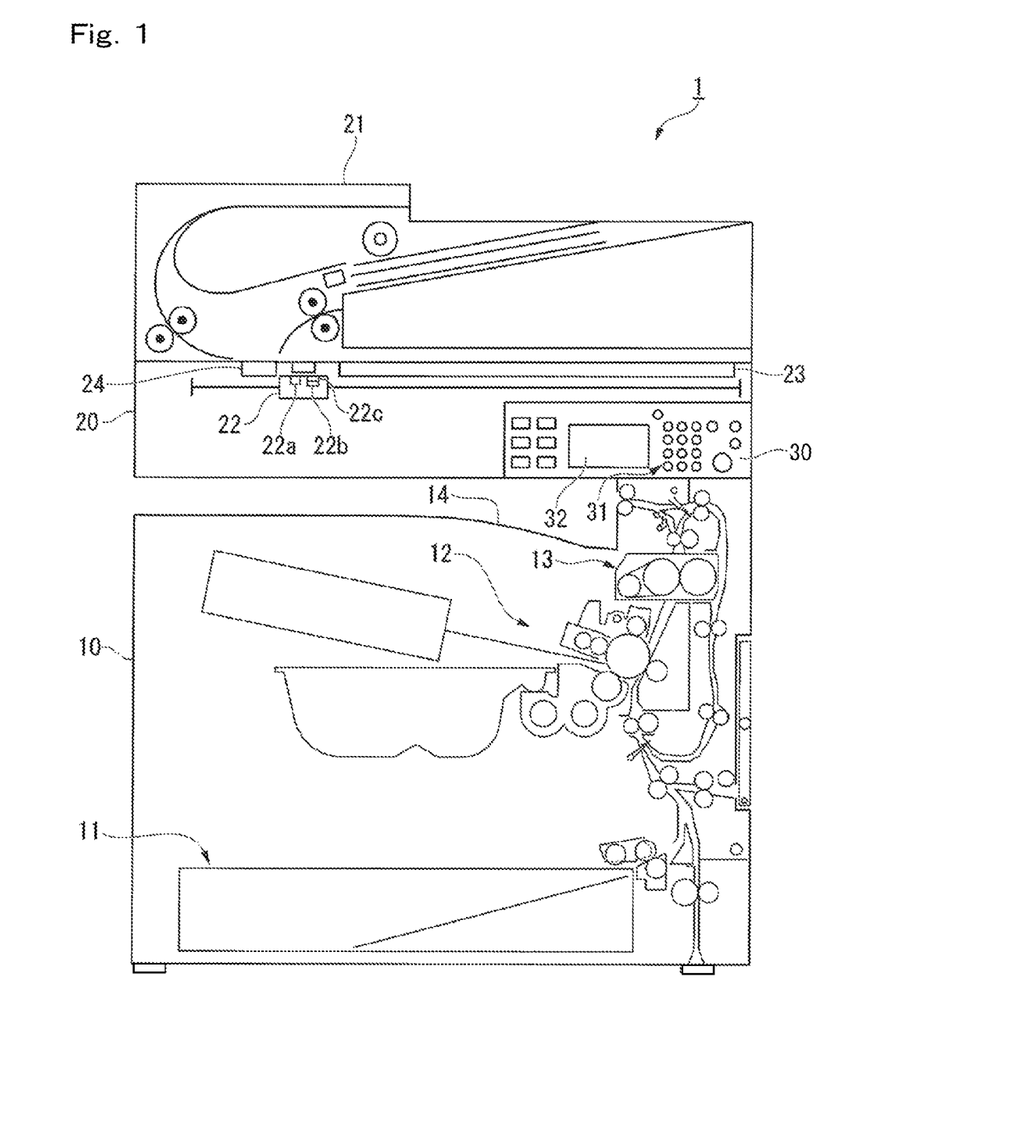
FIG. 1 is a front perspective view showing configuration of major parts of a multifunction peripheral in the embodiment of the present disclosure.
Figure 2:
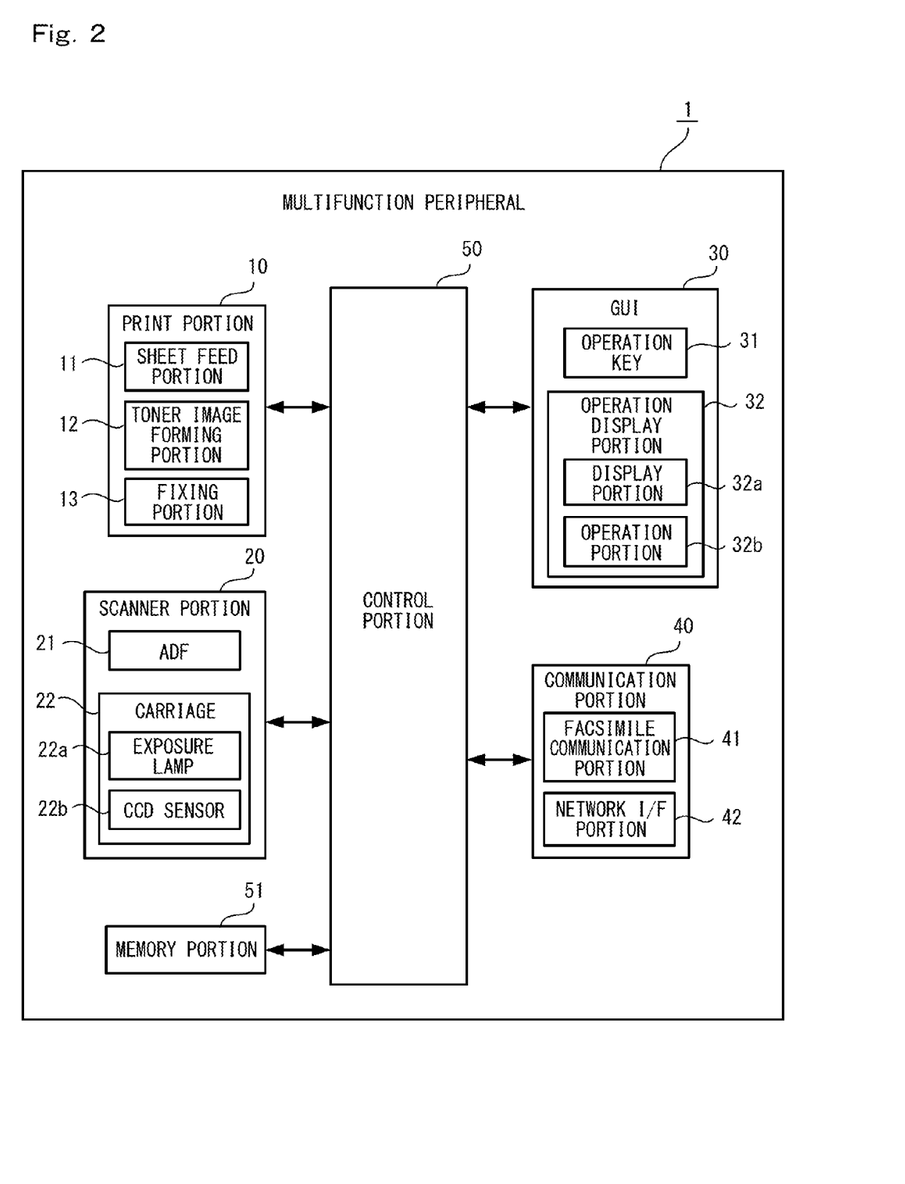
FIG. 2 is a functional block diagram of the multifunction peripheral in the embodiment of the present disclosure.

Hereinafter, one embodiment of the present disclosure will be described in detail based on the drawings. In the following, description will be given by exemplifying a multifunction peripheral having functions including a copying machine, a printer, and a facsimile, as an image forming apparatus having a scanner device according to the present disclosure. FIG. 1 is a front perspective view showing configuration of major parts of a multifunction peripheral 1 in the embodiment of the present disclosure. FIG. 2 is a functional block diagram of the multifunction peripheral 1 in the embodiment of the present disclosure. As shown in FIG. 1 and FIG. 2, the multifunction peripheral 1 includes a print portion 10, a scanner portion (scanner device) 20, a GUI (Graphical User Interface) 30, a communication portion 40, a control portion 50 and a memory portion 51.

The scanner portion 20 reads a document or the like (object) placed by a user under the control by the control portion 50, and generates document image data showing an image of the document and outputs the data to the control portion 50. The scanner portion 20 includes an ADF (Automatic Document Feeder) 21, a carriage 22, a document table 23 and a document reading slit 24. The carriage 22 carries an exposure lamp (light source) 22a, a CCD (Charge Coupled Device)

sensor (light detecting portion) 22b and so on, and reads documents sequentially fed by the ADF 21 or a document or the like placed on the document table 23.

Concretely, in reading a document placed on the document table 23, the carriage 22 reads the document by the CCD sensor 22b while moving longitudinally of the document table 23. On the other hand, in reading documents fed from the ADF 21, the carriage 22, situated at the position opposed to the document reading slit 24 (the position below the document reading slit 24), reads the documents sequentially fed from the ADF 21 by the CCD sensor 22b through the document reading slit 24.

The CCD sensor 22b of the present embodiment has an optical filter 22c that makes external incident light entering the document table 23 undetected. The optical filter 22c of the present embodiment is formed, for example, of a band-pass filter, and blocks transmission of wavelengths of external incident light components of the light entering the CCD sensor 22, to thereby exclude disturbance. Concretely, the optical filter 22c is designed to cut wavelengths of fluorescent lamp components (peaks at 490 nm, 540 nm, 610 nm in the case of a three band fluorescent lamp, for example). As a result, the CCD sensor 22b can detect any light from a display screen of a terminal device (peaks at 470 nm and 580 nm in the case of white LED (Light Emitting Diode) of liquid crystal backlight) without influence of disturbance.

The GUI 30 outputs a signal corresponding to an operation made by a user (operation signal) to the control portion 50, while displaying various information such as information showing the state of the multifunction peripheral 1 in accordance with the control by the control portion 50, and includes an operation key 31 and an operation display portion 32. The operation key 31 includes hard keys such as a copy start key, a copy stop/clear key, ten keys (numeric input keys) and a function switching key. The function switching key is provided for a user to switch the operation mode of the multifunction peripheral 1 to intended one of the copying function, the printing function, the scanning function and the facsimile function realized by the multifunction peripheral 1.

The operation display portion 32 includes a display portion 32a that displays a predetermined image under the control of the control portion 50, and an operation portion 32b that outputs an operation signal corresponding to an operation made on the display screen of the display portion 32a to the control portion 50. The display portion 32a is, for example, a liquid crystal panel or an organic EL panel. The operation portion 32b is, for example, a touch panel disposed oppositely to the display screen of the display portion 32a, and outputs a signal indicating the coordinates of a portion pressed down by the user, as the aforementioned operation signal.

The communication portion 40 communicates with a facsimile device at other end, or an external device such as a personal computer, and includes a facsimile communication portion 41 and a network I/P portion 42.

The control portion 50 integrally controls the overall operation of the multifunction peripheral 1 on the basis of an operation signal inputted from the GUI 30 and a signal received from an external device via the communication portion 40. The control portion 50 is composed of an internal memory, a CPU (Central Processing Unit), and various I/O interface lines for sending/receiving data to/from other portions.

The control portion 50 is able to switch the reading mode of the scanner portion 20 between a normal document scan mode (first mode) for reading a normal object (e.g., document) placed on the document table 23, and a display screen scan mode (second mode) for reading a display screen (e.g., liquid crystal screen, organic EL screen) of a self-luminous object (e.g., cellular phone, smartphone, tablet device) placed on the document table 23. Table 1 shows examples of initial settings for the reading condition in the normal document scan mode and the reading condition in the display screen scan mode.

TABLE 1

|  | Initial settings for normal document scan mode | Initial settings for display screen scan mode |
|---|---|---|
| Original size | Standard size of sheet such as A4, A3 Select standardized size of sheet by auto size detection | Cellular phone size/Smartphone size/Tablet size |
| Exposure | Normal: (4th of 7 levels/ Auto exposure) | With backlight: brighter (brighter than 1st of 7 levels) Without backlight: further brighter |
| Resolution | 300 DPI | 600 DPI |

As shown in Table 1, in the display screen scan mode, the size of an original to be read is preset for each type of terminal devices (cellular phone, smartphone, tablet device) rather than the standardized sizes defined by a standard as in the normal document scan mode. In the display screen scan mode, the illumination condition of the exposure lamp 22a in the presence of backlight is set to be brighter than that in the normal document scan mode. In the absence of backlight, the illumination condition is set further brighter than that in the presence of backlight.

The memory portion 51 stores a plurality of reading conditions including a reading condition in the display screen scan mode. The plural reading conditions include, for example, the reading condition in the normal document scan mode as described above, and the reading condition in the display screen scan mode as described above, and are set for each type of terminal devices (cellular phone, smartphone, tablet device). As will be described in detail later, the control portion 50 of the present embodiment is able to adjust the reading sensitivity of the scanner portion 20 on the basis of a light detection result by the CCD sensor 22b.

Figure 3:
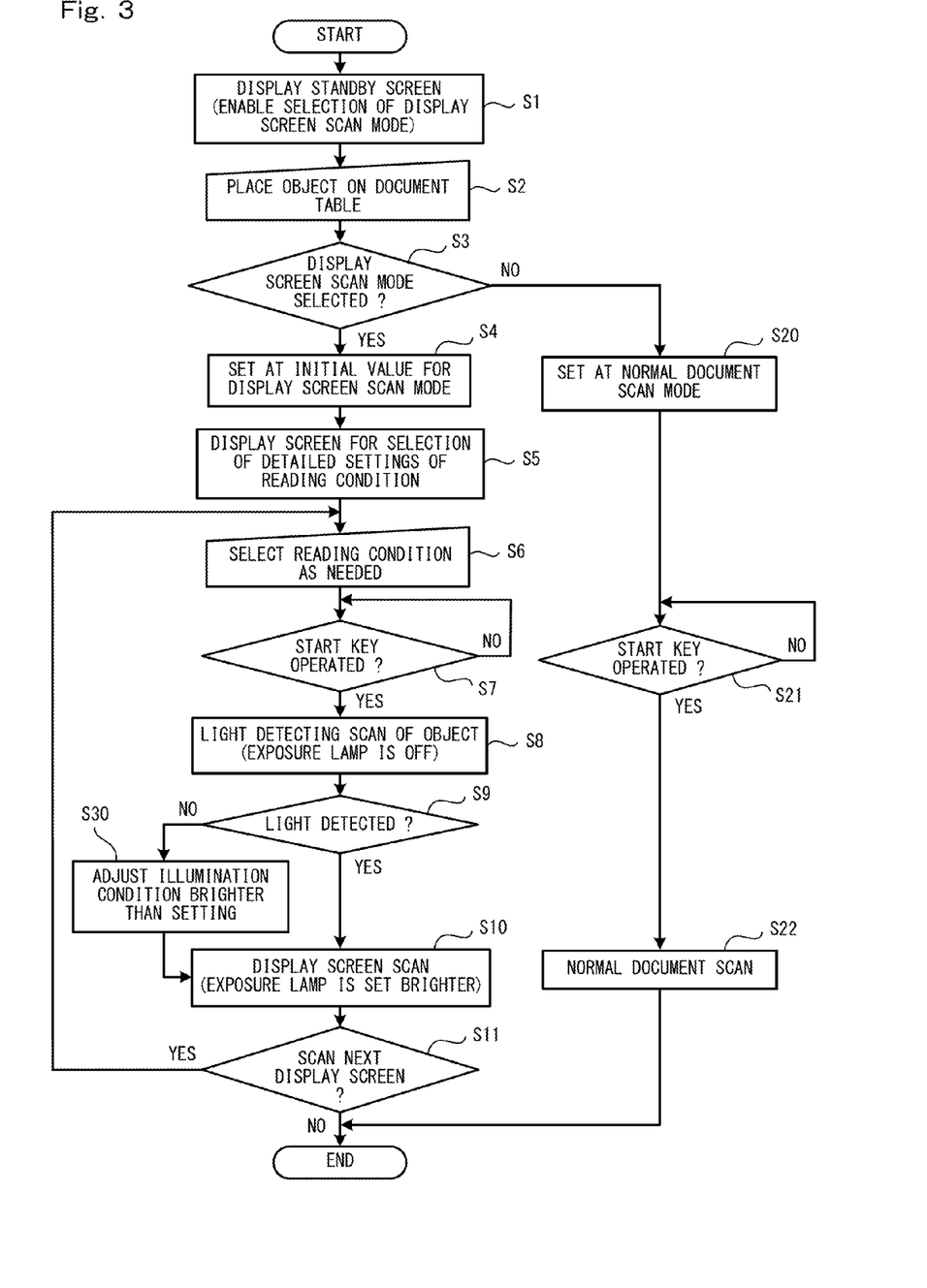
FIG. 3 is a flowchart showing operation of the multifunction peripheral in the embodiment of the present disclosure (particularly, a sequence of various processes in the scanner portion).

Next, operation of the multifunction peripheral 1 configured as described above will be described. FIG. 3 is a flow-chart showing operation of the multifunction peripheral 1 in the embodiment of the present disclosure (a sequence of various processes particularly in the scanner portion 20). As shown in FIG. 4, the control portion 50 controls the display portion 32a to display a standby screen for allowing selection of the display screen scan mode in a standby state (step S1).

Figure 4A:
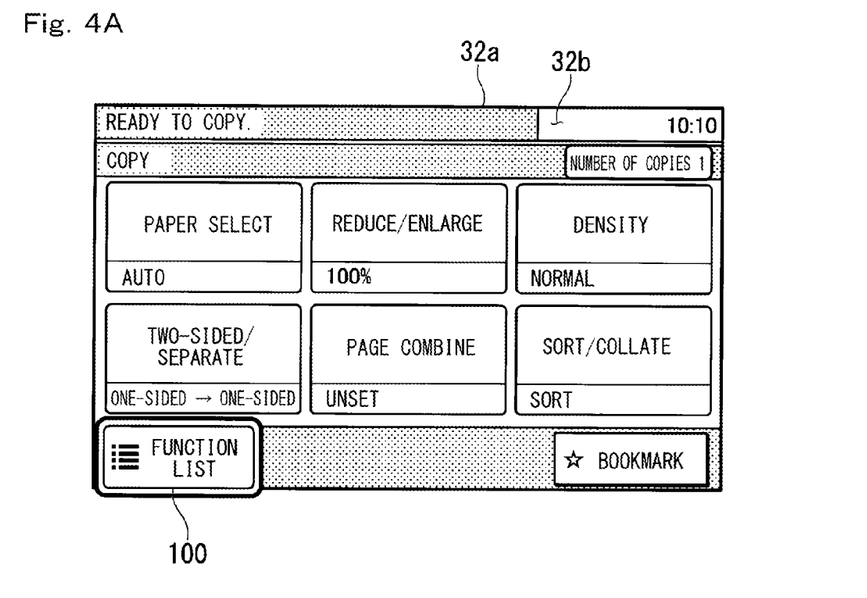
FIG. 4A and FIG. 4B are views showing a standby screen in the embodiment of the present disclosure.
Figure 4B:
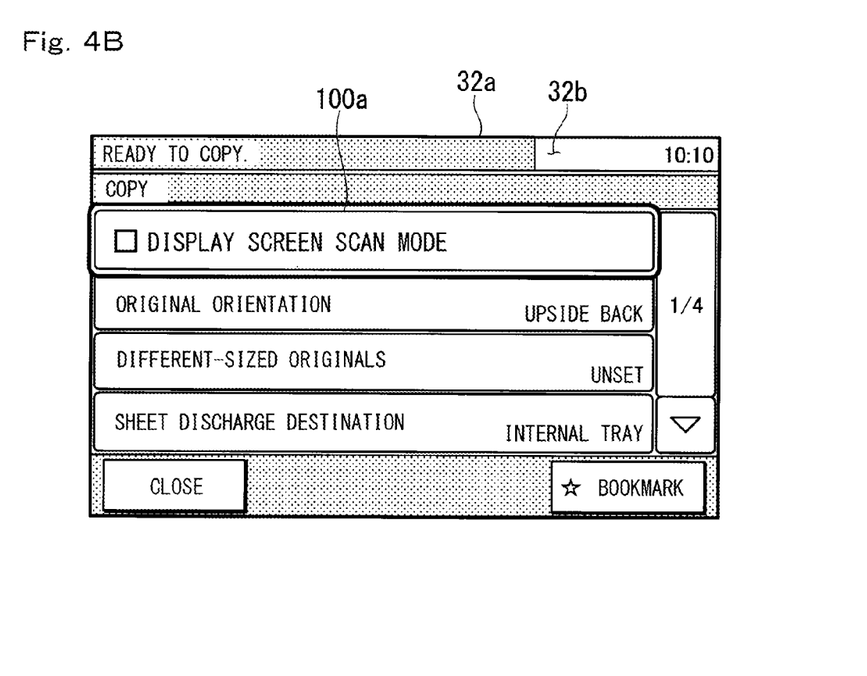

FIG. 4 is a view showing a standby screen in the embodiment of the present disclosure. As shown in FIG. 4A, the control portion 50 controls the display portion 32a to display a button 100 for "FUNCTION LIST" as well as buttons for "PAPER SELECT" and the like displayed by default. As shown in FIG. 4B, the control portion 50 controls the display portion 32a to display a button 100a for allowing selection of "DISPLAY SCREEN SCAN MODE" when the button 100 for "FUNCTION LIST" is pressed down.

Figure 5:
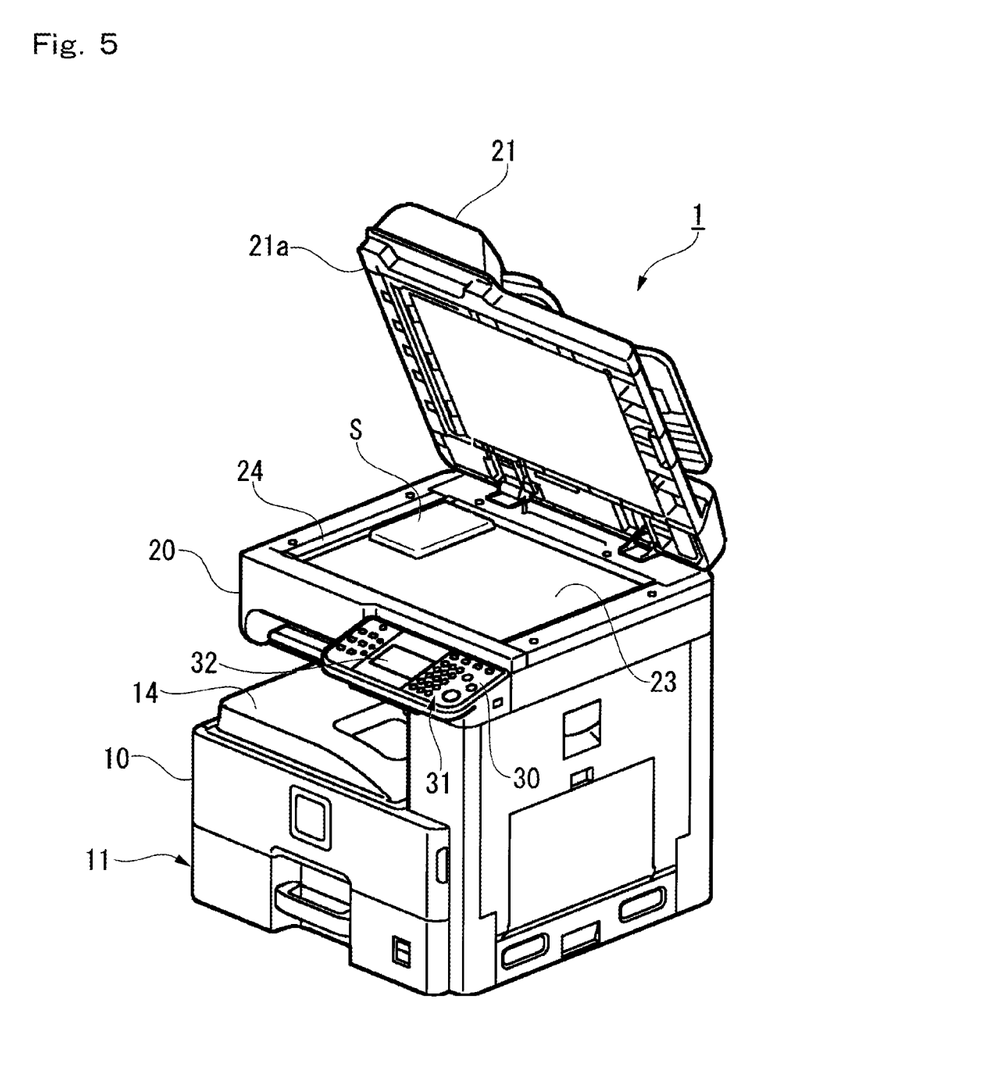
FIG. 5 is a view showing the state that a terminal device is placed as an object to be read on a document table in the embodiment of the present disclosure.

FIG. 5 is a view showing the state that a terminal device S is placed as an object to be read on the document table 23 in the embodiment of the present disclosure. As shown in FIG. 5, a user opens a document holding cover 21a that is integrally formed with the ADF 21, and places the object (terminal device 5) with its corner aligned with the back corner of the document table 23 in the same manner for a normal document (step S2). When the object is a thick article like the terminal device S, the document holding cover 21a is partly open, and ambient light will enter the document table 23.

The control portion 50 determines whether or not the display screen scan mode is selected (step S3). When the determination in step S3 is "YES", namely the object placed on the document table 23 is a self-luminous object like the terminal device S and the button 100a for "DISPLAY SCREEN SCAN MODE" is pressed down, the flow proceeds to step S4. On the other hand, when the determination in step S3 is "NO", namely the object placed on the document table 23 is a normal document rather than a self-luminous object like the terminal device S, the flow proceeds to step S20.

When the flow proceeds to step S20, the control portion 50 switches the reading mode of the scanner portion 20 to the aforementioned normal document scan mode. Then the control portion 50 executes a normal document scan (the exposure lamp 22a is ON) (S22) in response to an operation made on the start key by the user (step S21), and the scan sequence ends. On the other hand, when the flow proceeds to step S4, the control portion 50 switches the reading mode of the scanner portion 20 to the aforementioned display screen scan mode (initial value). Then the control portion 50 controls the display portion 32a to display a screen for selection of detailed settings of reading condition in the display screen scan mode (step S5).

Figure 6:
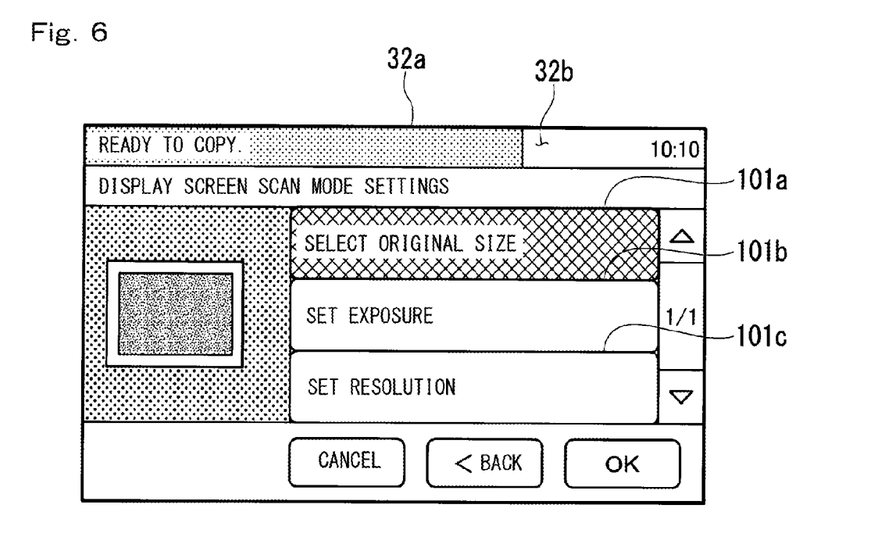
FIG. 6 is a view showing a screen for selecting settings of reading conditions in a display screen scan mode in the embodiment of the present disclosure.

FIG. 6 is a view showing a screen for selection of settings of reading condition in the display screen scan mode in the embodiment of the present disclosure. As shown in FIG. 6, the control portion 50 controls the display portion 32a to display buttons 101a to 101c for individually changing the reading conditions in the display screen scan mode set as the initial values. In the present embodiment, the button 101a is assigned to "SELECT ORIGINAL SIZE", the button 101b is assigned to "SET EXPOSURE", and the button 101c is assigned to "SET RESOLUTION". The user operates the buttons 101a to 101c as needed, to select the reading condition (step S6).

Figure 7:
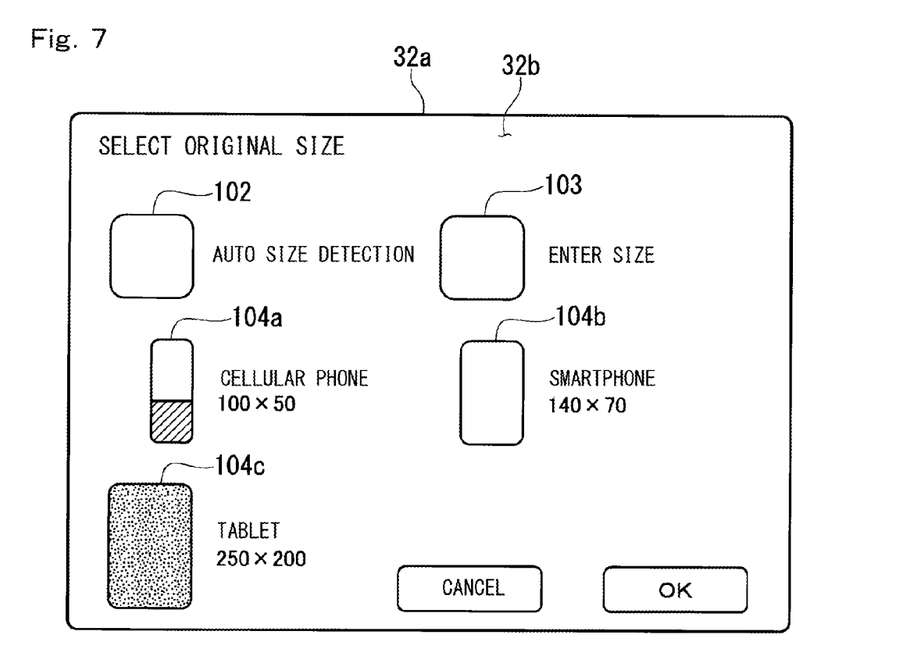
FIG. 7 is a view showing a screen for selecting original size of reading conditions in the display screen scan mode in the embodiment of the present disclosure.

FIG. 7 is a view showing a screen for selection of original size of the reading condition in the display screen scan mode in the embodiment of the present disclosure. As shown in FIG. 7, the control portion 50 controls the display portion 32a to display a button 102 for "AUTO SIZE DETECTION", a button 103 for "ENTER SIZE", and a button 104a for "CELLULAR PHONE", a button 104b for "SMARTPHONE", and a button 104c for "TABLET" that are the reading conditions (original size) preliminarily stored in the memory portion 51, when the button 101a for "SELECT ORIGINAL SIZE" is pressed down.

The button 102 for "AUTO SIZE DETECTION" is provided for instructing the control portion 50 to execute the process for detecting the original size of a self-luminous object like the terminal device S in the same manner as automatic size detection for a normal document. The button 103 for "ENTER SIZE" is provided for a user to manually enter the size of the original, for example, when the terminal device S is a new product or a non-standardized product. The buttons 104a to 104c are provided for a user to press down a corresponding button when the self-luminous object placed on the document table 23 is any one of "CELLULAR PHONE", "SMARTPHONE" and "TABLET DEVICE". By pressing down any one of the buttons, a user can easily set the reading condition corresponding to the button from the preliminarily stored reading conditions.

In the present embodiment, when the user selects and presses down any one of the buttons 104a to 104c for "CELLULAR PHONE", "SMARTPHONE" and "TABLET DEVICE", appropriate values that are determined experimentally and previously stored are set in "SET EXPOSURE" and "SET RESOLUTION" together with the corresponding appropriate "ORIGINAL SIZE". As a result, the user can set the optimum reading condition and enabling reading of the display screen of the object only by selecting the type of the object to be read (cellular phone, smartphone or tablet device in the present embodiment). When the user intends to change the settings individually, the user can go back to the screen shown in FIG. 6 and "SET EXPOSURE" or "SET RESOLUTION".

Next, the control portion 50 executes a light detecting scan (step S8) in response to an operation made on the start key by the user (step S7). The light detecting scan is intended to detect light from the object placed on the document table 23. In the present embodiment, presence or absence of light from the object placed on document table 23 is detected by the CCD sensor 22b while the carriage 22 moves longitudinally of the document table 23.

The light detecting scan determines whether or not the object placed on the document table 23 itself emits light, and unlike the case of the normal document scan, the exposure lamp 22a that illuminates an object can interfere with the light detection. For this reason, the control portion 50 turns off the exposure lamp 22a when the CCD sensor 22b conducts the light detecting scan. This enables the CCD sensor 22b to detect faint light (like backlight of a liquid crystal screen) emitted from the object, whereby the light detecting accuracy in step S8 can be improved.

In the present embodiment, the CCD sensor 22b has the optical filter 22c that makes the external incident light entering the document table 23 undetected. As shown in FIG. 5, when the object is the terminal device S having thickness, the document holding cover 21a sometimes cannot be closed. In such a case, transmission of the external incident light entering the document table 23 (for example, wavelengths of fluorescent lamp components) is blocked by the optical filter 22c. As a result, the CCD sensor 22b becomes able to detect only the light from the object placed on the document table 23 and the light detecting accuracy in step S8 can be further improved.

Next, the control portion 50 determines whether or not the CCD sensor 22b detects the light from the object as a result of the light detecting scan (step S9). When the determination in step S9 is "YES", namely the light from the object placed on the document table 23 is on, the flow proceeds to step S10. On the other hand, when the determination in step S9 is "NO", namely the light from the object placed on the document table 23 is out, the flow proceeds to step S30.

When the flow proceeds to step S30, the control portion 50 adjusts the illumination condition further brighter than the setting. Concretely, the control portion 50 changes the illumination condition from "WITH BACKLIGHT" to "WITHOUT BACKLIGHT" shown in Table 1, and adjusts the brightness of the exposure lamp 22a so as to compensate for the shortage of illumination, to thereby adjust the reading sensitivity. On the other hand, when the CCD sensor 22b detects the light from the object placed on the document table 23, the control portion 50 determines that the object is the self-luminous terminal device S, and adjusts the reading sensitivity to "WITH BACKLIGHT". Therefore, even when the terminal device S shifts into a power saving mode and the light of the display screen is turned out directly before scanning, for example, it is possible to automatically adjust the reading sensitivity, and to appropriately read graphics and so on displayed on the display screen of the terminal device S.

Next, the control portion 50 causes execution of the display screen scan (step S10). In the present embodiment, the exposure lamp 22a that illuminates an object placed on the document table 23 is provided, and as shown in Table 1, the illumination condition of the exposure lamp 22a in the display screen scan mode is automatically adjusted according to the presence or absence of backlight. This is because, as shown in FIG. 8, more light from the exposure lamp 22a is required for appropriately scanning the display screen of the terminal device S without backlight, compared with that with backlight.

Figure 8A:
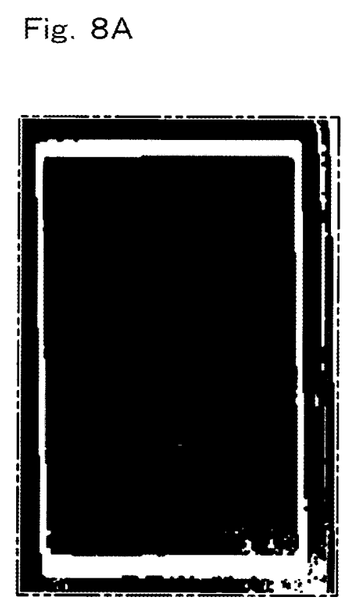
FIG. 8A is an image of a liquid crystal screen of a terminal device without backlight read under an illumination condition of "WITH BACKLIGHT" in a display screen scan mode in the embodiment of the present disclosure.
Figure 8B:
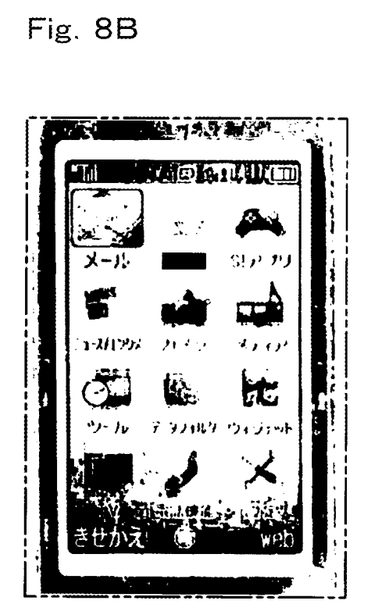
FIG. 8B is a view of an image read under an illumination condition of "WITHOUT BACKLIGHT".

FIG. 8A is an image of a liquid crystal screen of the terminal device S without backlight read under the illumination condition of "WITH BACKLIGHT" in the display screen scan mode of the embodiment of the present disclosure. FIG. 8B is a view showing an image read under the illumination condition of "WITHOUT BACKLIGHT". As can be seen from FIG. 8A, when the liquid crystal screen is read under the illumination condition of "WITH BACKLIGHT", the image is really dark, and the screen cannot be distinguished. On the other hand, as can be seen from FIG. 8B, when the exposure lamp 22a is set to be "further brighter" by switching into the illumination condition of "WITHOUT BACKLIGHT" (see Table 1), the screen can be distinguished.

As described above, it is experimentally recognized that in conducting reading in the display screen scan mode, the display screen can be read appropriately by adjusting the illumination condition of the exposure lamp 22a according to whether or not light is detected. In the case of scanning the next display screen, the flow returns to step S6 to allow selection of the reading condition as needed (step S11). On the other hand, when scanning of the next display screen will not be conducted, the scan sequence in the display screen scan mode ends.

As described above, the foregoing embodiment employs the configuration having the CCD sensor 22b for detecting light from an object placed on the document table 23, and the control portion 50 for adjusting the reading sensitivity for the object on the basis of a detection result by the CCD sensor 22b. Accordingly, by automatically adjusting the reading sensitivity by adjusting the illumination condition for the object according to whether or not the light is detected from the object placed on the document table 23, the display screen of the terminal device S can be appropriately read. Therefore, it is possible to obtain the scanner portion 20 and the multifunction peripheral 1 capable of appropriately reading the display screen of the terminal device S.

The preferred embodiment of the present disclosure has been described by referring to the drawings, however, the present disclosure is not limited to the above embodiment. The forms, combinations and the like of the constituents shown in the above embodiment are merely examples, and various modifications may be made according to particular design requests and the like without departing from the scope of the subject matter of the present disclosure.

For example, the above embodiment has described the form where the CCD sensor for reading a document is used also as the light detecting portion, however, the present disclosure is not limited to this, and a dedicated light detecting sensor may be provided separately as the light detecting portion.

For example, the above embodiment has described that the reading sensitivity for the object is adjusted through adjustment of the brightness of the light source to "WITH BACKLIGHT" or "WITHOUT BACKLIGHT" on the basis of the detection result of the light detecting portion, however, the present disclosure is not limited to this, and the brightness of the light source may be adjusted continuously rather than discontinuously depending on the output value of the light detecting portion (intensity of the light from the object (e.g., brightness), concretely voltage value of photoelectric conversion).

The reading sensitivity for the object may be directly adjusted, for example, by adjusting the reading resolution (DPI) as well as by adjusting the brightness of the light source.

For example, in the above embodiment, "ORIGINAL SIZE", "EXPOSURE" and "RESOLUTION" are exemplified as examples of initial settings of the reading condition in the normal document scan mode and for the reading condition in the display screen scan mode as shown in Table 1, however, the present disclosure is not limited to this. In the case where the multifunction peripheral 1 is adapted for color copying, "COLOR MODE" may be made settable. For example, "monochrome" may be set in the normal document scan mode, and "COLOR" or "GRAY SCALE" may be made selectable in the display screen scan mode.

For example, the above embodiment has described that the user is allowed to select the reading condition as needed in scanning the next screen (step S11→step S6). In such a case, the read image may be previewed on the screen as shown, for example, in FIG. 6 together with an image adjustment button to allow the user to adjust the image as appropriate.

For example, the above embodiment has described the image forming apparatus according to the present disclosure by referring to the multifunction peripheral, however, the present disclosure may be applied to other image forming apparatuses such as a copying machine, without limited to this. The present disclosure may also be applied to a single scanner device separated from the image forming apparatus. In this case, the constituents such as the control portion are provided in the scanner device.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A scanner device comprising: a document table; a light detecting portion that detects light from an object placed on the document table; a reading portion that reads an image of the object by scanning the object placed on the document table; and a control portion that adjusts reading sensitivity for the object on the basis of a detection result of the light detecting portion; and a display portion that displays a predetermined image;

an operation portion that outputs an operation signal corresponding to an operation made on a display screen of the display portion; and a memory portion preliminarily storing a plurality of reading conditions including a reading condition for a self-luminous object, wherein the control portion controls to display buttons for allowing selection of the plural reading conditions on the display screen prior to detection by the light detecting portion, and when an operation signal of a selected button is correspondent to the reading condition for the self-luminous object, and light is not detected as a result of detection by the light detecting portion, the control portion adjusts the light source to be brighter than that in the selected reading condition.

2. The scanner device according to claim 1, further comprising a light source that illuminates the object placed on the document table, wherein the control portion adjusts brightness of the light source on the basis of the detection result of the light detecting portion to adjust the reading sensitivity for the object.

3. The scanner device according to claim 2, wherein the control portion turns off the light source when the light detecting portion conducts detection.

4. The scanner device according to claim 2, wherein the light detecting portion has an optical filter for making external incident light entering the document table undetected.

5. The scanner device according to claim 1 wherein the control portion turns off the light source when the light detecting portion conducts detection.

6. The scanner device according to claim 5, wherein the light detecting portion has an optical filter for making external incident light entering the document table undetected.

7. The scanner device according to claim 1 wherein the light detecting portion has an optical filter for making external incident light entering the document table undetected.

8. The scanner device according to claim 1, wherein the control portion turns off the light source when the light detecting portion conducts detection.

9. The scanner device according to claim 1, wherein the light detecting portion has an optical filter for making external incident light entering the document table undetected.

10. An image forming apparatus comprising a scanner device, the scanner device including: a document table; a light detecting portion that detects light from an object placed on the document table; a reading portion that reads an image of the object by scanning the object placed on the document table; and a control portion that adjusts reading sensitivity for the object on the basis of a detection result of the light detecting portion, wherein the scanner device further includes: a display portion that displays a predetermined image;

an operation portion that outputs an operation signal corresponding to an operation made on a display screen of the display portion; and a memory portion preliminarily storing a plurality of reading conditions including a reading condition for a self-luminous object, and the control portion controls to display buttons for allowing selection of the plural reading conditions on the display screen prior to detection by the light detecting portion, and when an operation signal of a selected button is correspondent to the reading condition for the self-luminous object, and light is not detected as a result of detection by the light detecting portion, the control portion adjusts the light source to be brighter than that in the selected reading condition.

11. The image forming apparatus according to claim 10, wherein the scanner device further includes a light source that illuminates the object placed on the document table; and the control portion adjusts brightness of the light source on the basis of a detection result of the light detecting portion to adjust the reading sensitivity for the object.

12. The image forming apparatus according to claim 11, wherein the control portion turns off the light source when the light detecting portion conducts detection.

13. The image forming apparatus according to claim 11, wherein the light detecting portion has an optical filter for making external incident light entering the document table undetected.

14. The image forming apparatus according to claim 10 wherein the control portion turns off the light source when the light detecting portion conducts detection.

15. The image forming apparatus according to claim 14, wherein the light detecting portion has an optical filter for making external incident light entering the document table undetected.

16. The image forming apparatus according to claim 10 wherein the light detecting portion has an optical filter for making external incident light entering the document table undetected.

17. The image forming apparatus according to claim 10, wherein the control portion turns off the light source when the light detecting portion conducts detection.

18. The image forming apparatus according to claim 10, wherein the light detecting portion has an optical filter for making external incident light entering the document table undetected.

* * * * *